Oct. 5, 1954  A. V. ABERCROMBIE  2,690,593
MANUFACTURE OF PLASTIC COVERS AND PLASTIC ARTICLES
Filed March 19, 1952  4 Sheets-Sheet 1
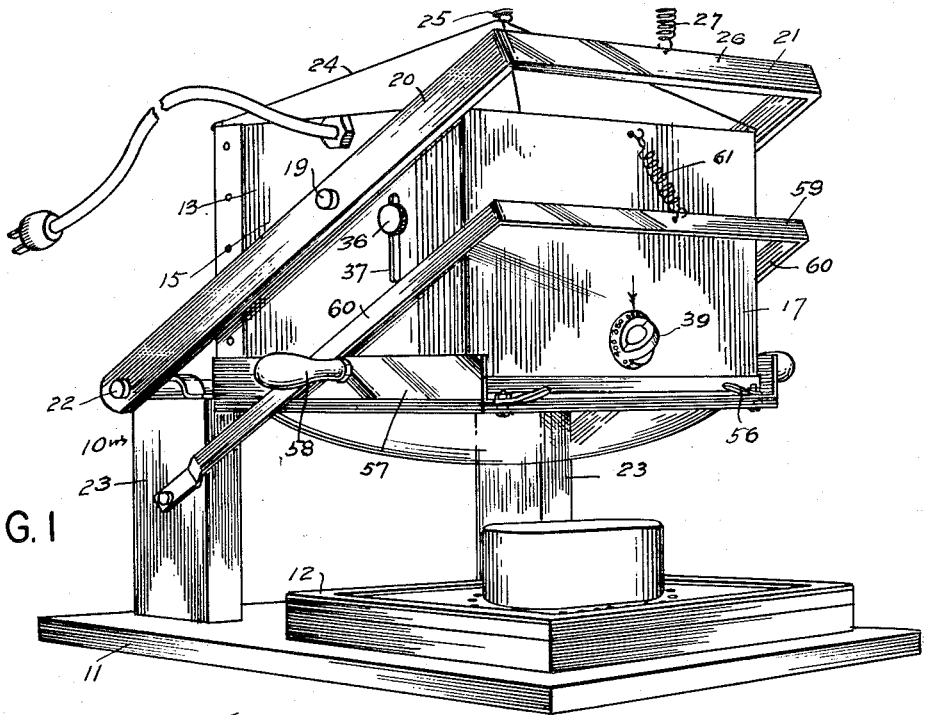
FIG. I
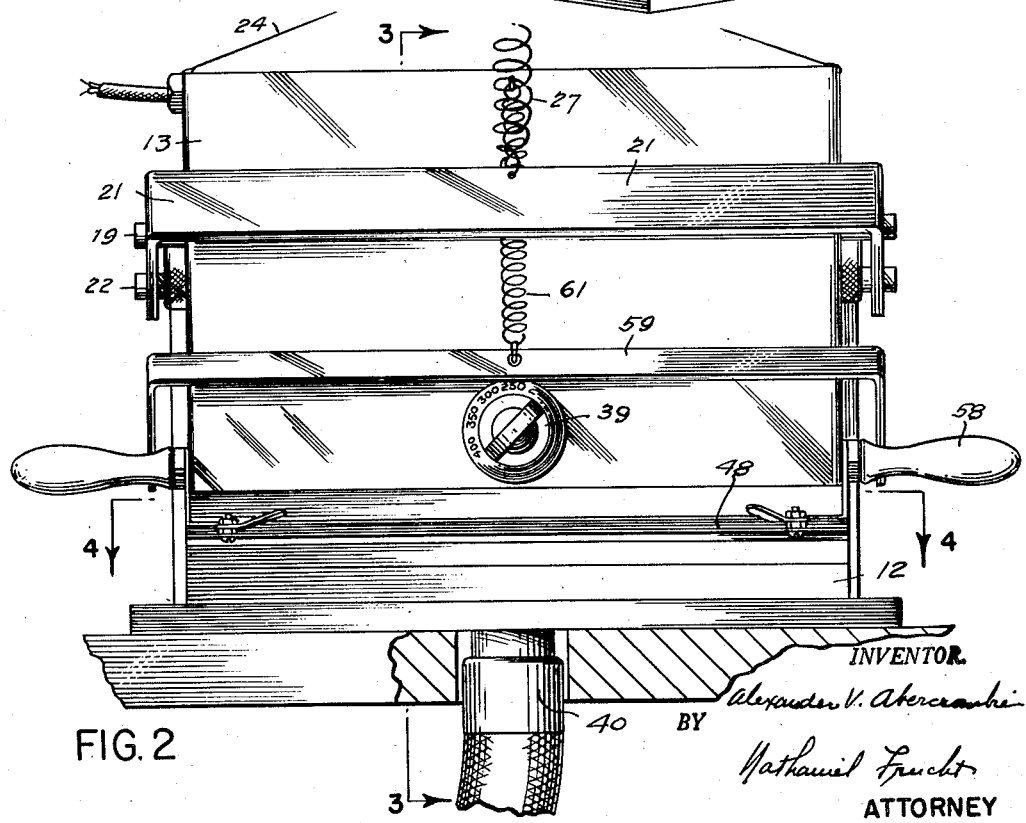
FIG. 2
INVENTOR.
Alexander V. Abercrombie
BY
Nathaniel Frucht
ATTORNEY

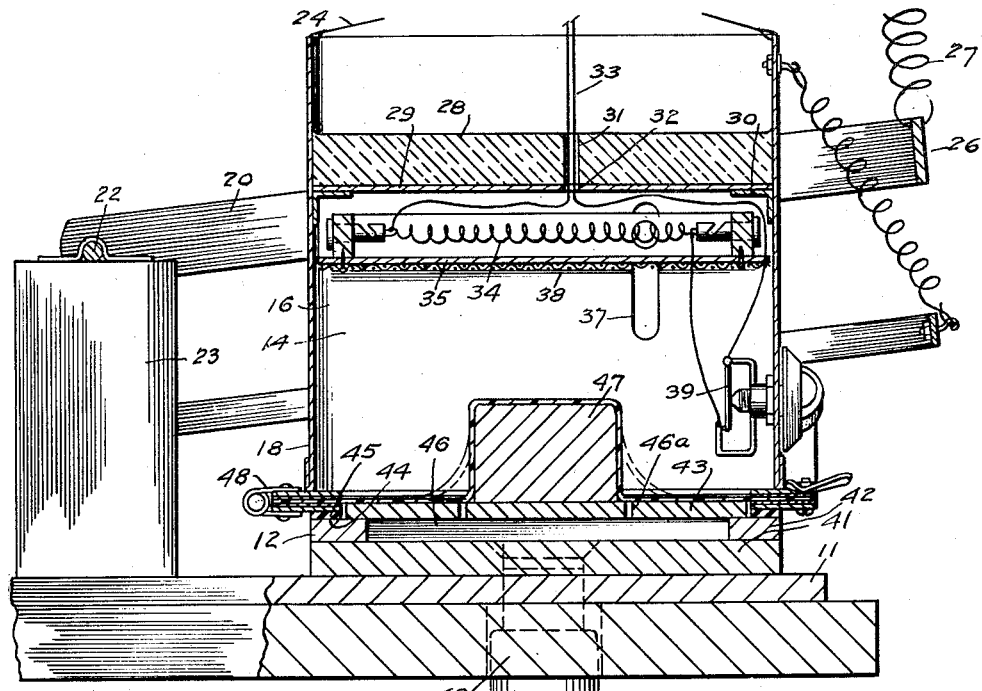
FIG. 3
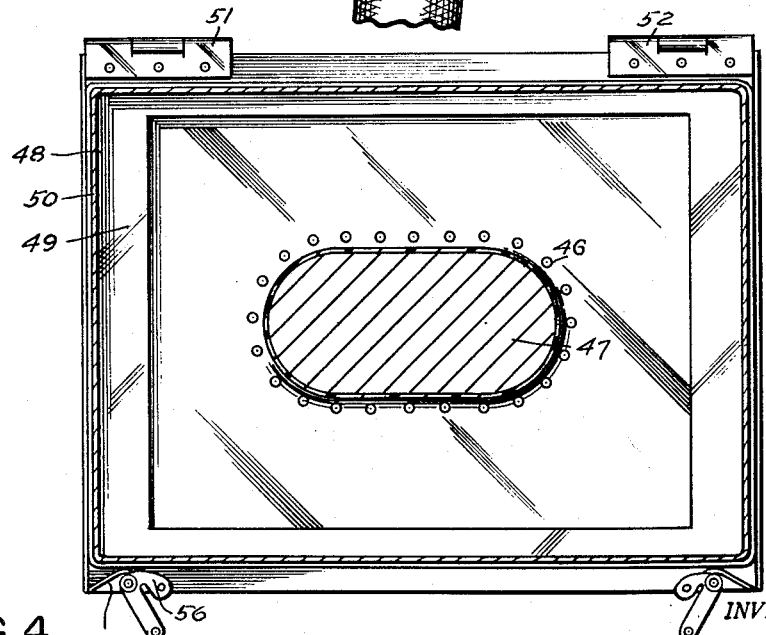
FIG. 4
FIG. 5
INVENTOR.
Alexander V. Abercrombie
BY Nathaniel Frucht
ATTORNEY Oct. 5, 1954  A. V. ABERCROMBIE  2,690,593
MANUFACTURE OF PLASTIC COVERS AND PLASTIC ARTICLES
Filed March 19, 1952  4 Sheets-Sheet 3

INVENTOR.
Alexander V. Abercrombie
BY
Nathaniel Frucht
ATTORNEY

Oct. 5, 1954 A. V. ABERCROMBIE 2,690,593
MANUFACTURE OF PLASTIC COVERS AND PLASTIC ARTICLES
Filed March 19, 1952 4 Sheets-Sheet 4

*INVENTOR.*
Alexander V. Abercrombie
BY
Nathaniel Frucht
ATTORNEY

Patented Oct. 5, 1954

2,690,593

UNITED STATES PATENT OFFICE 2,690,593

MANUFACTURE OF PLASTIC COVERS AND PLASTIC ARTICLES

Alexander V. Abercrombie, West Warwick, R. I., assignor to Plasticase Corporation, a corporation of Rhode Island Application March 19, 1952, Serial No. 277,499

3 Claims. (Cl. 18—19)

The present invention relates to the formation of plastic covers, and has particular reference to the molding of plastic sheet material to provide closures for manufactured articles.

The principal object of the invention is to provide a simple arrangement for encasing a manufactured article with an outer plastic closure.

Another object of the invention is to utilize plastic sheets to form an encasing closure for an article or product.

A further object of the invention is to provide an attractive encasing closure for shipping and displaying an article or product.

An additional object is to provide a plastic coating for sealing in and protecting an article or product against rusting, tarnishing, or other surface deterioration or attack.

A further object is to provide a simple procedure for manufacturing articles from plastic sheet stock.

With the above and other objects and advantageous features in view, the invention consists of a novel apparatus more fully disclosed in the detailed description following, in conjunction with the accompanying drawings, and more specifically defined in the claims appended thereto.

In the drawings,

Fig. 1 is a perspective view of an illustrative apparatus embodying the invention, the parts being in open position;

Fig. 2 is a front elevation of Fig. 1, the parts being in closed position, parts being in section;

Fig. 3 is a vertical section on the line 3—3 of Fig. 2;

Fig. 4 is a transverse section on the line 4—4 of Fig. 2;

Fig. 5 is a sectional detail of an edge portion of the forming platen;

Figure 7:
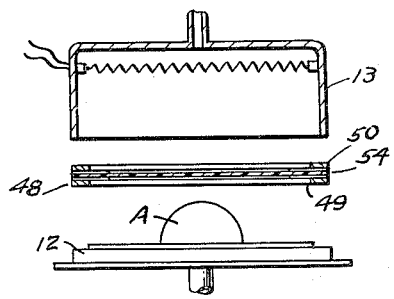
Figs. 7 to 11 are diagrammatic views showing the positions of the parts during manufacture of an encasing closure.

It has been found desirable to provide a simple method and an inexpensive apparatus for molding plastic sheets around an article or product so as to encase the article, whereby an attractive package results, the articles being protected against tarnish, rust, corrosion and the like and being visible through the encased closure. To this end, I provide a base upon which the article is positioned, and I provide a heater member which contains adjustable heating means and to which a platen is releasably attached, the platen being designed to hold a sheet of plastic material at the lower portion of the heater member. When the plastic sheet has been heated to "give" or become soft and yielding, the heater member is moved to lower the yielding plastic sheet over the article, whereby the plastic sheet, which is continuing to be heated, drapes or molds itself around the article. The draping or molding is assisted by providing suitable openings in the base which communicate with a reduced pressure chamber, whereby the semi-soft plastic is drawn closely around the article and into contact with the base, and supplemental air under pressure may be introduced above the plastic sheet during the draping operation to cooperate with the reduced pressure below the plastic sheet. The heater member is then lifted from the base, and the platen opened to permit removal of the article and its cooled encasing closure.

Referring to the drawings, the closure molding apparatus 10 includes a base 11 having an article support plate 12, and a heater 13 which includes a hollow housing 14 having side panels 15, 16, a front panel 17 and a rear panel 18. The side panels have pivot pins 19 which are mounted in side links 20 of a rectangular U-shaped frame 21, the rear ends of the side links being pivoted to a pivot rod 22, strap-seated in spaced standards 23, positioned at the rear of the base. The heater is resiliently urged upwardly by support wires 24 attached to the upper edges of the panels and secured to a suspension spring element 25 attached to an overhead ceiling or beam, the front link 26 of the frame 21 also having a suspension spring element 27 attached to the overhead ceiling or beam, whereby the heater is normally in spaced superimposed relation to the base 11 and its article support plate 12, and is manually movable to seat on the base 11 and over the article support plate 12, a forming platen being interposed as hereinafter described.

The heater housing 14 has an insulating shield 28 supported on a support plate 29 and side angles 30 welded or otherwise secured to the housing side panels, the shield 28 and plate 29 being pierced as at 31 and 32 for passage of electric wiring 33. A heater element 34 is mounted on a movable platform 35 which has two side pins 36 extending outwardly through slots 37 in the side panels, whereby the heater element may be selectively moved to and from the lower open end of the heating housing to vary the heating effect. The platform 35 is preferably of open frame type, with screening 38 mounted on the lower surface as illustrated. An electric switch 39 is mounted on the front housing panel, the wiring 33 connecting the switch and the heater element in series.

The base 11 is bored to receive one end of a tubular suction hose 40, and the support plate 12 includes a similarly bored bottom plate 41, a central annular frame 42, and an upper plate 43 of less width and length than the central frame to provide an annular support shoulder 44, which is preferably provided with an annular flexible gasket 45 of rubber or the like. The inner chamber 46 formed by the annular frame 42 and the bottom and upper plates 41 and 43 is thus in free communication with the suction hose 40 and constitutes a low pressure chamber which communicates with a series of openings 46a in the upper plate for a purpose hereinafter described, these openings being preferably positioned to encircle an article 47 to be encased, in close proximity to the lower edges of the article.

A forming platen 48, see Figs. 4 and 5, is of book type with frame sides, and includes a lower annular seat 49 and an upper annular conforming seat 50 hingedly secured to the lower seat by edge hinges 51, 52, the contiguous surfaces of the seat edges being provided with gripping material 53 such as abrasive rubber or sandpaper, whereby a sheet 54 of plastic material may be placed in the platen to be edge gripped therein. The upper seat 50 has edge cut outs 55 in the front edge, and the lower seat has manually turnable spring held lock catches 56, whereby the platen can be releasably locked to hold the plastic sheet in place.

The lower seat 49 has upwardly extending flexible metal side rails 57, see Fig. 1, the side rails being provided with handles 58, whereby the platen may be pressed upwardly to frictionally seat on the lower portion of the heater housing, and may be detached therefrom by downward pressure on the handles 58. It is preferred, however, to provide a U-frame 59 having its sides 60 hinged to the standards 23 and its front portion spring connected by a tension spring 61 to the heater housing, whereby downward pressure on the U-frame 59 engages the U-frame sides 60 with the handles to hold the platen down while the heater housing is moved upwardly.

Figure 9:
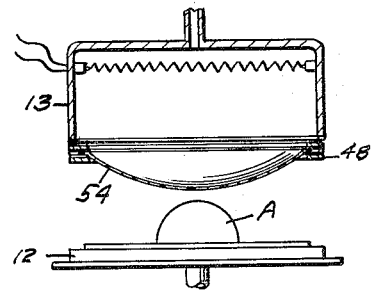
Figure 8:
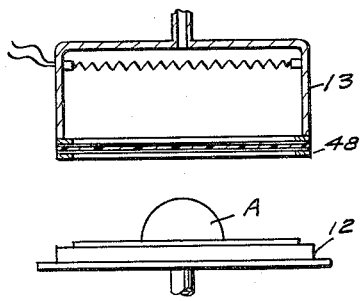
Figure 10:
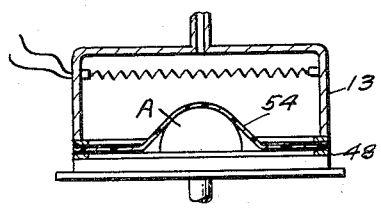
Figure 11:
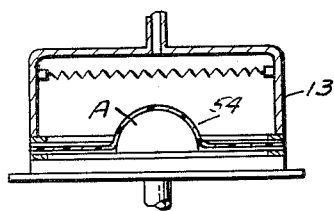
Figure 6:
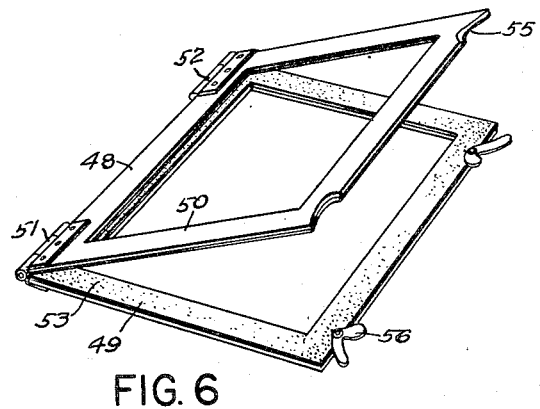
Fig. 6 is a perspective detail of the platen.

The operation of the novel apparatus may now be explained, referring to the diagrammatic Figures 7 to 11. An article A is placed on the article support plate 12, and a sheet of plastic 54 is placed in the plate 48; the platen 48 is then seated on the lower portion of the heater housing 14 as indicated in Fig. 8, whereby the platen and its plastic sheet are in superimposed relation to the base and the article on the base, and the heater housing is in superimposed relation to the platen. The switch 39 is now turned, and the heater imparts sufficient heat to the plastic sheet to produce a sag, as shown in Fig. 9, without however, causing any liquidation or excessive plasticity. The heater housing is now moved down to contact the sagging plastic sheet with the article A, see Fig. 10 and to seat on the support plate 12, whereupon the low pressure in the support plate and the resulting suction through the support plate openings draws the plastic sheet tightly and firmly around the article A as shown in Fig. 11. The heater housing is now pulled up while the U-frame 59 is held down, whereupon the platen remains on the support plate and the plastic immediately cools in its encasing shape. The platen is now opened, the formed plastic sheet is removed, and a new plastic sheet inserted; the platen is again seated on the lower portion of the heater housing and the operation is repeated.

Figure 12:
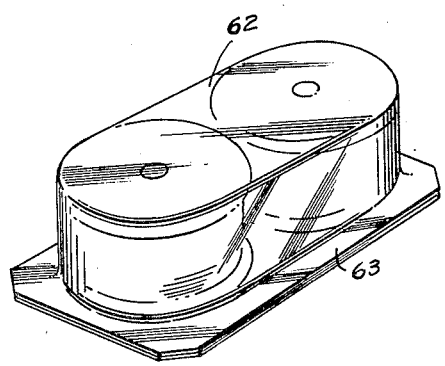
Figs. 12, 13 and 14 are perspective views showing a plastic encasing closure made in accordance with the invention, and respectively enclosing reels, a bracelet and a watch.
Figure 13:
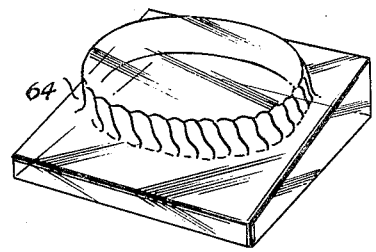
Figure 14:
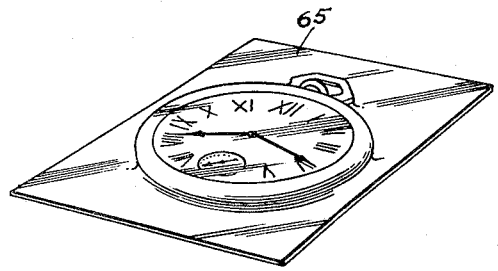
Figure 15:
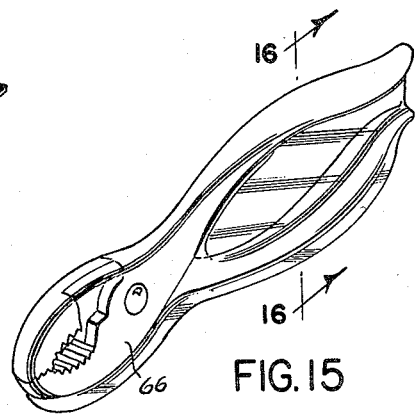
Fig. 15 is a perspective view of a plastic encasing closure for a pair of pliers.
Figure 16:
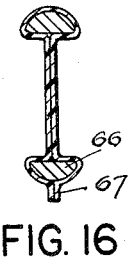
Fig. 16 is a section on the line 16—16 of Fig. 15.

Such encasings as are shown at 62 in Fig. 12 are readily formed, and are readily cemented to a plastic base 63 to provide an all transparent encasing closure for upstanding articles such as fishing reels or the like; similar encasings for a bracelet are shown at 64 and for a watch at 65. I have found that when parts of the heated sagging sheet touch other parts, the contacting portions fuse to form a seal, whereby an article such as pliers 66 or other product can be completely encased with plastic, by regulating the heat, the suction and the resulting draping or fusing of the plastic sheet to produce a complete enclosure as illustrated, any projecting fins such as indicated at 67 being subsequently trimmed if desired.

The above manufacturing procedure specifically relates to encasing articles of any desired size, shape, or material, and may also be used to form hollow articles of a shape corresponding to the shape of a master article, the hollow article being then mounted on a suitable support, either by fusing or cementing to a plastic support or the like, or by stapling or other mechanical securing. Translucent and opaque plastic sheets of different colors are preferred for this type of molding.

Although I have described a specific constructional embodiment of the invention, it is obvious that changes in the size, shape, and arrangement of parts and in the sequence of the process steps may be made to meet different article encasing and packaging requirements, without departing from the spirit or the scope of the invention as defined in the appended claims.

I claim:

1. In combination, an article support base, a forming platen in superimposed relation to the base, and a heater housing in superimposed relation to the platen, said platen having means for releasably holding a sheet of plastic and means for releasably mounting said platen on said heater housing to soften the plastic sheet, means for moving the heater housing and platen towards the base to envelop an article positioned thereon and means for separating the housing and platen.

2. In combination, an article support base, a forming platen in superimposed relation to the base, and a heater housing in superimposed relation to the platen, said platen having means for releasably holding a sheet of plastic and means for releasably mounting said platen on said heater housing to soften the plastic sheet, means for moving the heater housing and platen towards the base to envelope an article positioned thereon, means for separating the housing and platen, and means for subjecting the surface of the plastic sheet adjacent the base to reduced pressure.

3. In combination, an article support base, a forming platen in superimposed relation to the base, and a heater housing in superimposed relation to the platen, said platen having means for releasably holding a sheet of plastic and means for releasably mounting said platen on said heater housing to soften the plastic sheet, means for moving the heater housing and platen towards the base to envelop an article positioned thereon, means for separating the housing and platen, and means for subjecting the surface of the plastic sheet adjacent the base to reduced pressure and the surface of the plastic sheet adjacent the heater housing to increased pressure.

References Cited in the file of this patent

UNITED STATES PATENTS

| Number | Name | Date |
| --- | --- | --- |
| 1,856,694 | De Correvont | May 3, 1932 |
| 2,210,509 | Strauch | Aug. 6, 1940 |